(12) United States Patent
Zhang et al.

(10) Patent No.: US 11,093,334 B2
(45) Date of Patent: Aug. 17, 2021

(54) METHOD, DEVICE AND COMPUTER PROGRAM PRODUCT FOR DATA PROCESSING

(71) Applicant: EMC IP Holding Company LLC, Hopkinton, MA (US)

(72) Inventors: Yong Zhang, Shanghai (CN); Pengfei Wu, Shanghai (CN); Ming Zhang, Shanghai (CN); Kun Wang, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 46 days.

(21) Appl. No.: 16/294,857

(22) Filed: Mar. 6, 2019

(65) Prior Publication Data
US 2020/0133780 A1   Apr. 30, 2020

(30) Foreign Application Priority Data
Oct. 26, 2018   (CN) .......................... 201811261837.6

(51) Int. Cl.
*G06F 11/14*   (2006.01)
*H04L 29/08*   (2006.01)
*G06F 16/14*   (2019.01)

(52) U.S. Cl.
CPC ...... *G06F 11/1425* (2013.01); *G06F 11/1435* (2013.01); *G06F 16/156* (2019.01); *H04L 67/1051* (2013.01); *G06F 2201/88* (2013.01)

(58) Field of Classification Search
CPC ............. G06F 11/1435; G06F 11/1425; G06F 2201/88; G06F 2211/104; G06F 16/1456; G06F 16/156; G06F 16/16; H04L 67/1051
See application file for complete search history.

(56) References Cited

U.S. PATENT DOCUMENTS

| | | | |
|---|---|---|---|
| 7,185,236 B1 * | 2/2007 | Moser ................. | G06F 11/2028 709/209 |
| 9,003,144 B1 * | 4/2015 | Hayes ................. | G06F 11/1092 711/162 |
| 9,116,862 B1 * | 8/2015 | Rath .................... | G06F 11/2097 |
| 2011/0107358 A1 * | 5/2011 | Shyam .................... | G06F 9/547 719/330 |
| 2012/0150930 A1 * | 6/2012 | Jin ...................... | G06F 11/1402 707/827 |
| 2014/0019405 A1 * | 1/2014 | Borthakur ............. | G06F 16/182 707/609 |
| 2014/0310244 A1 * | 10/2014 | Chambliss ............ | G06F 3/0665 707/639 |

(Continued)

*Primary Examiner* — Yolanda L Wilson
(74) *Attorney, Agent, or Firm* — Womble Bond Dickinson (US) LLP

(57) ABSTRACT

Embodiments of the present disclosure provide a method, a device and a computer program product for data processing. The method comprises determining, at a first node of a plurality of nodes of a metadata management system, a set of nodes from the plurality of nodes that store access information associated with a shard of metadata; determining, from the set of nodes, the number of available nodes capable of providing the shard; and adjusting the number of available nodes based on a threshold number. In this way, a distributed management of the shard of metadata in each node could be achieved without using the management node in a conventional way.

17 Claims, 3 Drawing Sheets

(56) References Cited

U.S. PATENT DOCUMENTS

2014/0330785 A1* 11/2014 Isherwood .......... G06F 11/1446
707/640
2016/0019125 A1* 1/2016 Madduri ............. G06F 11/1425
714/4.11
2018/0157511 A1* 6/2018 Krishnan .............. G06F 9/5088

* cited by examiner

METHOD, DEVICE AND COMPUTER PROGRAM PRODUCT FOR DATA PROCESSING

CROSS-REFERENCE TO RELATED APPLICATION

This patent application claims priority, under 35 U.S.C. § 119, of Chinese Patent Application No. 201811261837.6, filed Oct. 26, 2018, entitled "METHOD, DEVICE AND COMPUTER PROGRAM PRODUCT FOR DATA PROCESSING," which is incorporated by reference in its entirety.

FIELD

Embodiments of the present disclosure generally relate to data processing, and more specifically, to a method, a device and a computer program product for data processing.

BACKGROUND

In a search cluster of data protection, the indexing data is usually grouped into multiple indexes. An index can be split into multiple shards (partitions of indexing data) and each shard has the number of replicas. It is critical to keep tracks of the number of replicas of each shard and where shards are stored in the distributed search node. The shard information is the major metadata of the search cluster. The metadata management system is a core component of the search cluster.

In a search distributed system, it is expected that some search nodes fail constantly due to hardware and software failures. Therefore, if a distributed search system is expected to have high availability, the state of each replica should be monitored and managed in such a search distributed system. Typically, the expected number of replicas is defined by users. If the search node fails (or restarts), the metadata management system needs to not only know an event that the node has failed, but also create a new replica on the other search nodes to ensure that the desired number of available replicas is met.

In the conventional way, a master node is provided for managing each node. If the information of the shards in each slave node is to be obtained by the user, the user must send a request to the master node to enable the data access. This master-slave node distribution structure facilitates to maintain all the information of the data. However, the disadvantage is that once the master node fails, the user may not obtain information of all the slave nodes. In addition, in multiple cloud environments, the synchronization and communication processes of the master nodes in each cloud are complex.

SUMMARY

Embodiments of the present disclosure relate to a method, device and computer program product for data processing.

In a first aspect of embodiments of the present disclosure, there is provided a method for data processing. The method comprises determining, at a first node of a plurality of nodes of a metadata management system, a set of nodes from the plurality of nodes that store access information associated with a shard of metadata; determining, from the set of nodes, the number of available nodes capable of providing the shard; and adjusting the number of available nodes based on a threshold number.

In a second aspect of embodiments of the present disclosure, there is provided a device for data processing. The device comprises at least one processor and at least one memory including a computer program instruction. The at least one memory and the computer program instruction are configured, together with the at least processor, to cause an electronic device to execute acts of: determining, at a first node of a plurality of nodes of a metadata management system, a set of nodes from the plurality of nodes that store access information associated with a shard of metadata; determining, from the set of nodes, the number of available nodes capable of providing the shard; and adjusting the number of available nodes based on a threshold number.

In a third aspect of the present disclosure, there is provided a computer program product, which is tangibly stored on a non-transient computer readable medium and includes a machine executable instruction, the machine executable instruction, when executed, causing a machine to execute the steps of the method of the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features and advantages of example embodiments of the present disclosure will become more apparent. Several example embodiments of the present disclosure will be illustrated by way of example but not limitation in the drawings in which.

Throughout the drawings, the same or similar reference symbols refer to the same or similar elements.

DETAILED DESCRIPTION OF EMBODIMENTS

Various example embodiments of the present disclosure will be described below with reference to the accompanying drawings. It would be appreciated that these drawings and description are only about example embodiments. It should be pointed out that alternative embodiments of the structure and method disclosed herein would be conceivable according to the following description, and these alternative embodiments may be employed without departing from principles as claimed herein.

It is to be understood these example embodiments are discussed only for the purpose of enabling those skilled persons in the art to better understand and thus implement the present disclosure, rather than suggesting any limitations on the scope of the present disclosure.

As used herein, the term "includes", "comprises" and its variants are to be read as open-ended terms that mean "includes/comprises, but is not limited to." The term "based on" is to be read as "based at least in part on." The term "some example embodiments" is to be read as "at least some example embodiments"; and the term "another embodiment" is to be read as "at least one another embodiment". Relevant definitions of other terms may be included below.

In a search cluster of data protection, it is critical to keep tracks of the number of replicas of each shard and where shards are stored in the distributed search node. Therefore, if a distributed search system is expected to have high availability, the state of each replica should be monitored and managed in such a search distributed system.

Typically, the expected number of replicas is defined by users. If the search node fails (or restarts), the metadata management system needs to not only know the event that the node has failed, but also create a new replica on the other search nodes to ensure that the desired number of available replicas is met.

Figure 1:
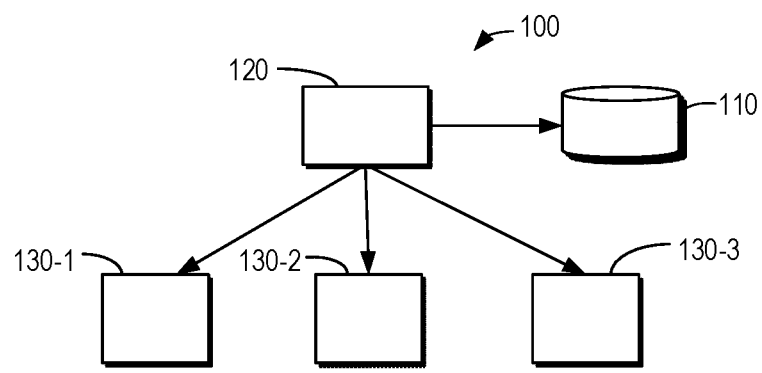
FIG. 1 illustrates a diagram of an example metadata management system architecture 100 according to embodiments of the present disclosure.

In the conventional way, a master node is provided for managing each node. FIG. 1 illustrates a diagram of an example metadata management system architecture 100 according to embodiments of the present disclosure. As shown in FIG. 1, the architecture 100 may comprise a master node 120 and a plurality of slave nodes 130-1 to 130-3. A plurality of slave nodes 130-1 to 130-3 may, for example, store shards of metadata. The master node 120 may communicate with the slave nodes 130-1 to 130-3, respectively. If the user 110 requests an access to the shard of metadata, the master node 120 may obtain the shard from the corresponding slave nodes of the slave nodes 130-1 to 130-3.

However, this approach has the disadvantage that once the master node 120 fails or is locked by the vendors, the user may not obtain information from all of the slave nodes 130-1 to 130-3. In addition, in multiple cloud environments, the synchronization and communication processes of the master nodes in each cloud are complex.

In order to solve the above-mentioned and other potential problems, embodiments of the present disclosure propose a new architecture of a distributed search node in which the master node is removed, such that all nodes in the architecture are equivalent.

Figure 2:
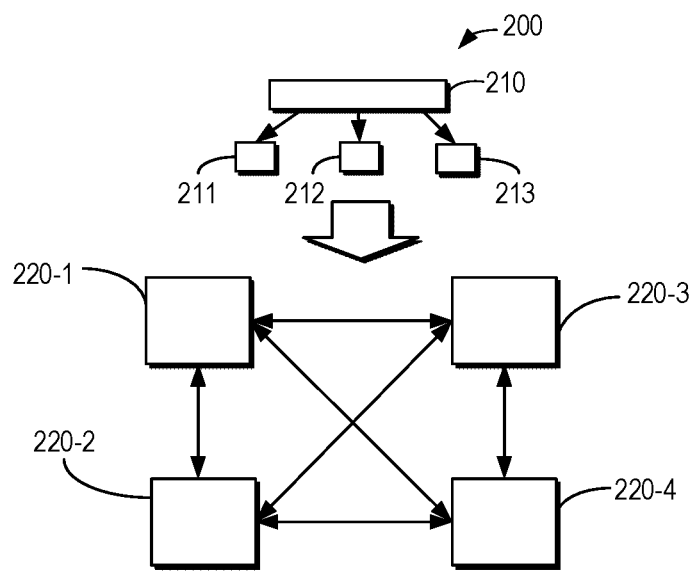
FIG. 2 illustrates a schematic diagram of an exemplary architecture 200, in which the embodiments of the present disclosure can be implemented.

With reference to FIG. 2 to FIG. 5, the method in accordance with embodiments of the present disclosure will be described in detail as below. FIG. 2 illustrates a schematic diagram of an exemplary architecture 200, in which the embodiments of the present disclosure can be implemented.

The architecture 200 may comprise, for example, a plurality of nodes 220-1, 220-2, 220-3, and 220-4 (hereinafter collectively referred to as nodes 220). These nodes may communicate with each other. It should be understood that the number of nodes shown in FIG. 2 is exemplary and the architecture 200 may comprise any other number of nodes 220.

As shown in FIG. 2, the metadata 210 can be, for example, split into a plurality of shards 211, 212, and 213. Here, the term "shard" can be considered as a data segment. If the user requests an access to one or more of the plurality of shards 211, 212, and 213, the requested access information of the shard may be find any of the nodes 220-1, 220-2, 220-3, and 220-4. A shard in nodes 220-1, 220-2, 220-3, and 220-4 can be considered as a replica of a plurality of shards 211, 212, and 213. The user may set the number of replicas of the shard according to its own requirement and the consideration of the system security, such that the number of nodes including a replica of the shard may be determined.

Figure 3:
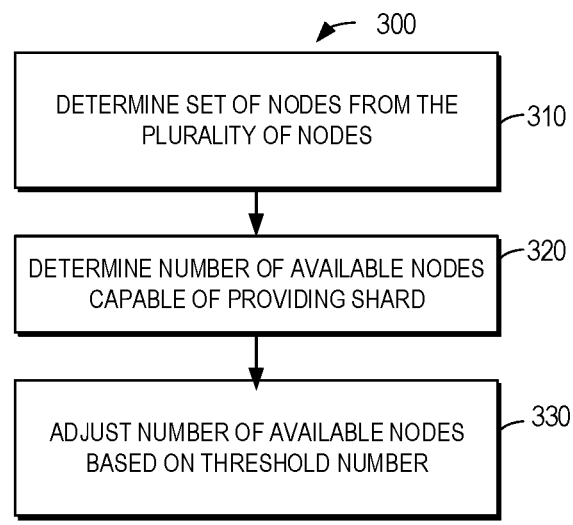
FIG. 3 illustrates a flowchart of a method 300 according to embodiments of the present disclosure.

FIG. 3 illustrates a flowchart of a method 300 according to embodiments of the present disclosure. The method 300 illustrated in FIG. 3 can be implemented at architecture 200 as shown in FIG. 2. For the purpose of discussion, the method 300 will be described with reference to FIG. 2.

As shown in FIG. 3, at 310, at node 220-1 of the plurality of nodes of the metadata management system, a set of nodes may be determined from the plurality of nodes 220-1, 220-2, 220-3, and 220-4 that store access information associated with a shard (e.g. shard 211) of metadata 210.

Figure 4:
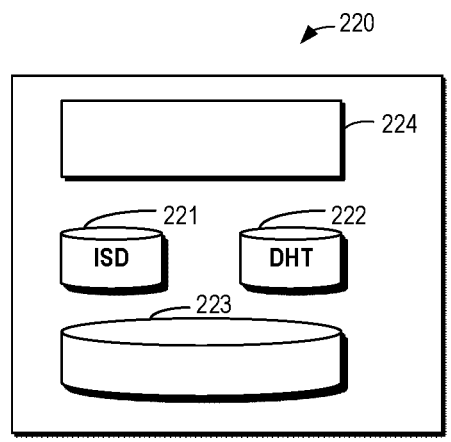
FIG. 4 illustrates a schematic diagram of a node in accordance with an embodiment of the present disclosure.

FIG. 4 shows a schematic diagram of a node 220 according to embodiments of the present disclosure. At node 220, the access information associated with the shard may, for example, be stored in a distributed hash table (DHT) 222 which includes an entry associated with the access information of the shard. The entry may include, for example, a hash index corresponding to the identifier of the shard and the node address which can provide the shard.

An exemplary distributed hash table in DHT 222 at node 220 is shown in Table 1 as below.

TABLE 1

| DHT | |
| --- | --- |
| Hash_shard | Shard Provider |
| U3Tf1 | 10.11.1.0 |
| Kf98y | 10.11.1.1 |

In Table 1, "U3Tf1" may refer to a hash index corresponding to the identifier of the shard 211, while "10.11.1.0" may be a node address which may provide the shard 211. An entry consisting of the hash index and node address may be considered as access information associated with the shard. Although in Table 1 above, only the node address providing the shard "U3Tf1" is listed, it should be understood that an entry may comprise multiple addresses associated with different nodes for one shard. That is, each shard may be provided from multiple providers.

According to some embodiments, if an access request for shard 211 is received, the node 220-1 may determine a set of nodes storing access information associated with shard 211. The request may be received, for example, by data index daemon 224 in node 220 shown in FIG. 4. The data index daemon 224 is used to manage local index data and databases and to transmit and receive messages associated with the data index.

According to some embodiments, the node 220-1 may obtain data which needs to be periodically queried, to use the data as a shard, so that a set of nodes storing access information associated with the shard may be determined. In this case, a shard including the access information is locally stored at the node 220-1, and the time at which the shard was last detected is stored in the index shard database (ISD) 221 of the node 220-1.

The index shard database 221 of the node 220 is shown in FIG. 4, which manages additional information of the index shard. The entry associated with the additional information may include, for example, a hash index corresponding to the identifier of the shard and the time stamp at which the shard was last detected. This time stamp may, for example, be considered as the time of the system.

Some example entries in ISD 221 at node 220 are shown in Table 2 as below.

TABLE 2

| ISD | |
|---|---|
| Hash_shard | Timer |
| U3Tf1 | 1526980300 |
| Yu34r | 1526980521 |

Similar to Table 1, in Table 2, "U3Tf1" may be a hash index corresponding to the identifier of the shard 211, and "1526980300" is the time at which the shard 211 was last detected in the node 220-1.

It should be understood that the shard represented by "Hash_shard" in Table 2 is stored at the current node. The shard represented by "Hash_shard" in Table 1 is not necessarily stored at the current node. Thus, it will be appreciated that the access information associated with a shard of DHT 222 at one node (e.g., node 220-1) may be shared by all other nodes (e.g., nodes 220-2, 220-3, and 220-4).

According to some embodiments, the node 220-1 may transmit a first query request for access information to other nodes than the first node of the plurality of nodes. The node 220-1 may determine a node including access information among other nodes based on the response received from the other node for the first query request. The node 220-1 may determine a set of nodes based on the determined node and the node 220-1 itself. It should be understood that since the shards associated with the entries in the DHT 222 at the node 220 are not necessarily stored locally, the node 220-1 may determine the set of nodes based on the access information of the other nodes and the access information of the first node itself.

Referring back to FIG. 3, at block 320, node 220-1 determines, from the set of nodes, the number of available nodes which may provide the shard.

As described above, the DHT 222 at node 220 may determine the set of nodes that can provide the shard, however, it may not be decided whether the nodes in the set of nodes may still provide the shard currently. For example, when a node suddenly loses power, a node fails, and some storage space in the node fails.

According to some embodiments, node 220-1 transmits a second query request for the availability of a shard to a node in the set of nodes. Node 220-1 determines the number of available nodes in the set of nodes based on the response to the second query request received from the nodes in the set of nodes.

As described above, node 220 can include a data index daemon 224 for receiving and transmitting a message of a data index, such as a second query request for the availability of a shard. According to some embodiments, the second query request may include an identifier of the shard such that the node in the set of nodes looks up the path information associated with the shard in the stored path information based on the identifier to respond.

As shown in FIG. 4, node 220 may also include an indexing shard library 223, which may be understood as a database based on key values. A hash index of the shard and the path information associated with the shard storage are included in the index shard library 223. Once the node may find the corresponding shard storage path by the identifier of the shard in the second query request, it may be determined whether the shard is provided currently, to procide a corresponding response.

An example in the index shard library 223 at node 220 is shown in Table 3.

TABLE 3

| Index Shard Library | |
|---|---|
| Hash_shard | Timer |
| U3Tf1 | /data/index1/0 |
| Yu34r | /data/index1/1 |

Similar to Table 1, in Table 3, "U3Tf1" may be a hash index corresponding to the identifier of the shard 211, and "/data/index1/0" is a storage path of the shard 211 on the node 220.

Referring again to FIG. 3, at block 330, node 220-1 adjusts the number of available nodes based on the threshold number. As described above, a shard in each node can be viewed as a replica of shard 211 of metadata 210 in FIG. 4. The number of replicas required for slicing is due to the user's reservation. Too many replicas will cause redundancy, wasting node resources, and too few replicas will not be able to meet the security of metadata.

According to some embodiments, if the determined number of available nodes is different from the threshold number, node 220-1 adds or removes one or more nodes such that the number of adjusted available nodes is equal to a threshold number.

According to some embodiments, if the determined number of available nodes is greater than a threshold number, one or more nodes may be removed. In the removal operation, node 220 removes the entries associated with the shard from its ISD 221. For example, the entry associated with shard "Yu34r" in Table 2 above, i.e. the hash index and timestamp of the shard, is removed. The message indicating the removal may be, for example, received by the data index daemon 224 of the node 220 from other nodes, or may be generated by the node itself.

According to some embodiments, if the determined number of available nodes is less than a threshold number, one or more nodes may be incremented. In an add operation, node 220 inserts an entry associated with the shard to its ISD 221, i.e. a hash index of the shard and a timestamp. The message indicating the addition may be, for example, received by the data index daemon 224 of the node 220 from other nodes, or may be generated by the node itself.

In addition, it should be noted that after the detection of the node 220 for one shard, if the shard is stored on the node, the node updates the corresponding timestamp in the ISD 221, regardless of whether the detection is triggered by itself, or triggered by query requests from other nodes. In this way, network congestion due to detection of certain shards on the node at the same time does not occur.

Figure 5:
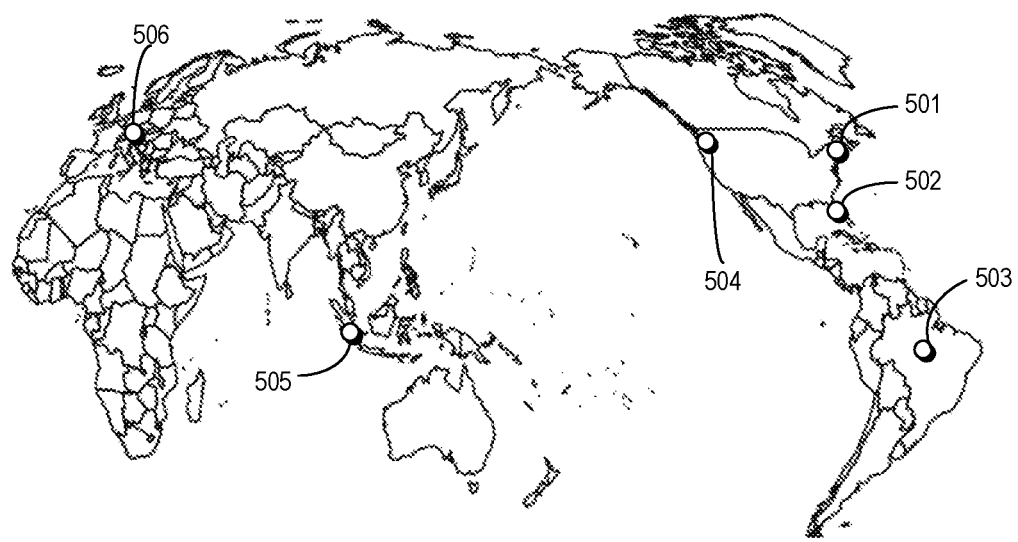
FIG. 5 illustrates a schematic diagram of an example in accordance with an embodiment of the present disclosure.

FIG. 5 shows a schematic diagram of an example in accordance with an embodiment of the present disclosure. The operation of the method described above is again explained in the following by means of the embodiment shown in FIG. 5.

FIG. 5 shows nodes 501 to 506. Nodes 501 through 506 are both in a normal operating state. Upon detection, nodes 510, 503, and 504 include target shards. It can be understood that for shard, the system needs to have a replica of the shard at three nodes. The current node status can be represented by Table 4.

TABLE 4

| | Current State 1 of Nodes | | | | | |
|---|---|---|---|---|---|---|
| Node | 501 | 502 | 503 | 504 | 505 | 506 |
| State | Running | Running | Running | Running | Running | Running |
| Shard | Yes | No | Yes | Yes | No | No |

If node 503 loses power, node 503 cannot provide a shard. Then the current node state can be represented by Table 5.

TABLE 5

| | Current State 2 of Nodes | | | | | |
|---|---|---|---|---|---|---|
| Node | 501 | 502 | 503 | 504 | 505 | 506 |
| State | Running | Running | Stopped | Running | Running | Running |
| Shard | Yes | No | Yes (NA) | Yes | No | No |

It can be seen that only two nodes can provide a replica of the shard, which does not meet the system needs. Thus, node 505 is added as a node that includes a replica of the shard, that is, node 505 inserts a hash index and timestamp associated with the shard in its ISD. The node state after the addition of the node 505 can be represented by Table 6.

TABLE 6

| | Current State 3 of Nodes | | | | | |
|---|---|---|---|---|---|---|
| Node | 501 | 502 | 503 | 504 | 505 | 506 |
| State | Running | Running | Stopped | Running | Running | Running |
| Shard | Yes | No | Yes (NA) | Yes | Yes | No |

If node 503 is powered back on, the node can re-send the shard, that is, four nodes can provide a replica of the shard, resulting in redundancy of the replica, again failing to meet system requirements. In this case, the shard may be removed from one of the plurality of nodes with available shards, for example, the shard of node 504 is removed. The current node status can be represented by Table 7.

TABLE 7

| | Current State 4 of Nodes | | | | | |
|---|---|---|---|---|---|---|
| Node | 501 | 502 | 503 | 504 | 505 | 506 |
| State | Running | Running | Running | Running | Running | Running |
| Shard | Yes | No | Yes | No | Yes | No |

The method for distributed node management proposed by the embodiments of the present disclosure can avoid the disadvantages caused by the master-slave node architecture in the conventional way, realize peer node distribution, and flexible management manner. This saves system resources and significantly improves system compatibility.

Figure 6:
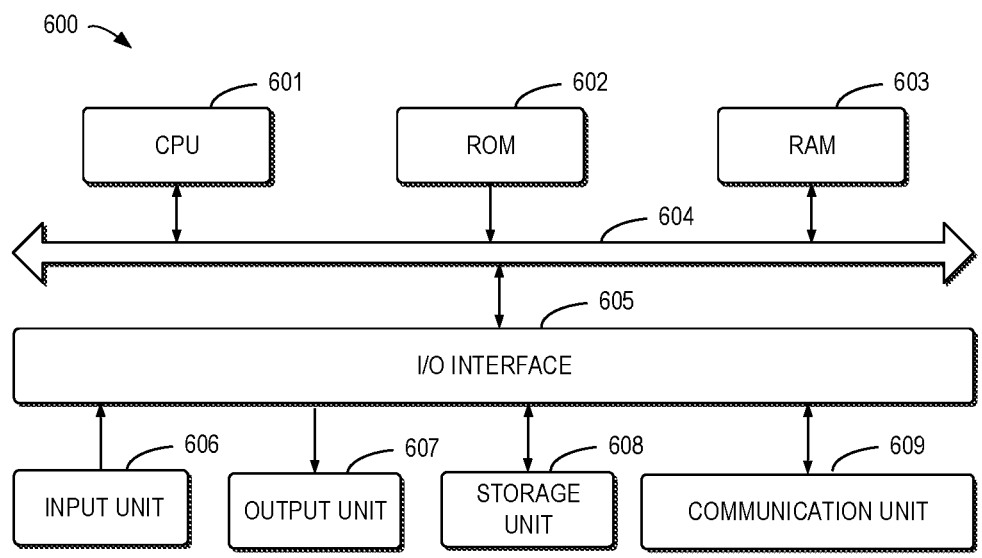
FIG. 6 illustrates a schematic block diagram of a device 600 for implementing embodiments of the present disclosure.

FIG. 6 is a schematic block diagram illustrating a device 600 that may be used to implement embodiments of the present disclosure. As shown in FIG. 6, the device 600 comprises a central processing unit (CPU) 601 which can execute various appropriate actions and processing based on the computer program instructions stored in a read-only memory (ROM) 602 or the computer program instructions loaded into a random access memory (RAM) 603 from a storage unit 604. The RAM 603 also stores all kinds of programs and data required by operating the storage device 600. CPU 601, ROM 602 and RAM 603 are connected to each other via a bus 604 to which an input/output (I/O) interface 605 is also connected.

A plurality of components in the device 600 are connected to the I/O interface 605, comprising: an input unit 606, such as keyboard, mouse and the like; an output unit 607, such as various types of displays, loudspeakers and the like; a storage unit 608, such as magnetic disk, optical disk and the like; and a communication unit 609, such as network card, modem, wireless communication transceiver and the like. The communication unit 609 allows the device 600 to exchange information/data with other devices through computer networks such as Internet and/or various telecommunication networks.

Each procedure and processing as described above, such as method 300, can be executed by the processing unit 601. For example, in some embodiments, method 300 can be implemented as computer software programs which are tangibly included in a machine-readable medium, such as the storage unit 604. In some embodiments, the computer program can be partially or completely loaded and/or installed to the device 600 via the ROM 602 and/or the communication unit 609. When the computer program is loaded to the RAM 603 and executed by the CPU 601, one or more steps of the above described method 300 are implemented.

The present disclosure may be a system, a device and/or a computer program product. The computer program product may include a computer readable storage medium (or media) having computer readable program instructions thereon for carrying out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of data storage, comprising:
   determining, at a first node of a plurality of nodes of a metadata management system, a set of nodes from the plurality of nodes that store access information associated with a shard of metadata, wherein the access information includes an entry associated with the access information of the shard, the entry including a hash index corresponding to an identifier of the shard and a node address that provides the shard, wherein determining the set of nodes comprises:
   obtaining data to be queried periodically as the shard, and determining a set of nodes storing the access information associated with the shard;
   determining, from the set of nodes, a number of available nodes capable of providing the shard; and
   adjusting the number of available nodes based on a threshold number.

2. The method of claim 1, wherein determining the set of nodes comprises:
   in response to receiving an access request for the shard, determining a set of nodes storing the access information associated with the shard.

3. The method of claim 1, wherein determining the number of available nodes comprises:
   transmitting, to a node in the set of nodes, a second query request for availability of the shard; and
   determining, based on a response to the second query request received from the node in the set of nodes, determining the number of available nodes in the set of nodes.

4. The method of claim 3, wherein the second query request comprises an identifier of the shard, to enable the node in the set of nodes to search for path information associated with the shard from stored path information based on the identifier, to provide the response.

5. The method of claim 1, wherein adjusting the number comprises:
in response to the number of available nodes being different from the threshold number, equaling the adjusted number of available nodes to the threshold number by adding or removing one or more nodes.

6. A method of data storage, comprising:
determining, at a first node of a plurality of nodes of a metadata management system, a set of nodes from the plurality of nodes that store access information associated with a shard of metadata, wherein the access information includes an entry associated with the access information of the shard, the entry including a hash index corresponding to an identifier of the shard and a node address that provides the shard, wherein determining the set of nodes comprises:
transmitting, to other nodes of the plurality of nodes than the first node, a first query request for the access information,
determining, based on a response to the first query request received from the other nodes, a node from the other nodes that comprises the access information; and
determining the set of nodes based on the determined node and the first node;
determining, from the set of nodes, a number of available nodes capable of providing the shard; and
adjusting the number of available nodes based on a threshold number.

7. The method of claim 6, wherein the first query request comprises an identifier of the shard, to enable the other nodes to search for the access information associated with the shard from stored access information based on the identifier, to provide the response.

8. A device for data processing, comprising:
at least one processor; and
a memory coupled to the at least one processor and comprising instructions stored therein, the instructions, when executed by the at least one processor, causing the device to perform operations, the operations comprising:
determining, at a first node of a plurality of nodes of a metadata management system, a set of nodes from the plurality of nodes that store access information associated with a shard of metadata, wherein the access information includes an entry associated with the access information of the shard, the entry including a hash index corresponding to an identifier of the shard and a node address that provides the shard, wherein determining the set of nodes comprises:
obtaining data to be queried periodically as the shard, and
determining a set of nodes storing the access information associated with the shard;
determining, from the set of nodes, a number of available nodes capable of providing the shard; and
adjusting the number of available nodes based on a threshold number.

9. The device of claim 8, wherein determining the set of nodes comprises:
in response to receiving an access request for the shard, determining a set of nodes storing the access information associated with the shard.

10. The device of claim 8, wherein determining the number of available nodes comprises:

transmitting, to a node in the set of nodes, a second query request for availability of the shard; and
determining, based on a response to the second query request received from the node in the set of nodes, determining the number of available nodes in the set of nodes.

11. The device of claim 10, wherein the second query request comprises an identifier of the shard, to enable the node in the set of nodes to search for path information associated with the shard from stored path information based on the identifier, to perform the response.

12. The device of claim 8, wherein adjusting the number comprises:
in response to the number of available nodes being different from the threshold number, equaling the adjusted number of available nodes to the threshold number by adding or removing one or more nodes.

13. A device for data processing, comprising:
at least one processor; and
a memory coupled to the at least one processor and comprising instructions stored therein, the instructions, when executed by the at least one processor, causing the device to perform operations, the operations comprising:
determining, at a first node of a plurality of nodes of a metadata management system, a set of nodes from the plurality of nodes that store access information associated with a shard of metadata, wherein the access information includes an entry associated with the access information of the shard, the entry including a hash index corresponding to an identifier of the shard and a node address that provides the shard, wherein determining the set of nodes comprises:
transmitting, to other nodes of the plurality of nodes than the first node, a first query request for the access information,
determining, based on a response to the first query request received from the other nodes, a node from the other nodes that comprises the access information, and
determining the set of nodes based on the determined node and the first node;
determining, from the set of nodes, a number of available nodes capable of providing the shard; and
adjusting the number of available nodes based on a threshold number.

14. The device of claim 13, wherein the first query request comprises an identifier of the shard, to enable the other nodes to search for the access information associated with the shard from stored access information based on the identifier, to provide the response.

15. A computer program product being tangibly stored on non-transient computer-readable storage medium and comprising machine-executable instructions, the machine-executable instructions, when executed, causing a machine to perform operations, the operations comprising:
determining, at a first node of a plurality of nodes of a metadata management system, a set of nodes from the plurality of nodes that store access information associated with a shard of metadata, wherein the access information includes an entry associated with the access information of the shard, the entry including a hash index corresponding to an identifier of the shard and a node address that provides the shard, wherein determining the set of nodes comprises:
obtaining data to be queried periodically as the shard, and determining a set of nodes storing the access information associated with the shard;

determining, from the set of nodes, a number of available nodes capable of providing the shard; and adjusting the number of available nodes based on a threshold number.

16. The computer program product of claim 15, wherein determining the set of nodes comprises:

in response to receiving an access request for the shard, determining a set of nodes storing the access information associated with the shard.

17. A computer program product being tangibly stored on non-transient computer-readable storage medium and comprising machine-executable instructions, the machine-executable instructions, when executed, causing a machine to perform operations, the operations comprising:

determining, at a first node of a plurality of nodes of a metadata management system, a set of nodes from the plurality of nodes that store access information associated with a shard of metadata, wherein the access information includes an entry associated with the access information of the shard, the entry including a hash index corresponding to an identifier of the shard and a node address that provides the shard, wherein determining the set of nodes comprises:

transmitting, to other nodes of the plurality of nodes than the first node, a first query request for the access information, determining, based on a response to the first query request received from the other nodes, a node from the other nodes that comprises the access information, and determining the set of nodes based on the determined node and the first node;

determining, from the set of nodes, a number of available nodes capable of providing the shard; and adjusting the number of available nodes based on a threshold number.

* * * * *